United States Patent
Sheldon, Jr. et al.

[11] Patent Number: 5,909,299
[45] Date of Patent: Jun. 1, 1999

[54] MICROSATELLITE SYSTEM FOR HIGH-VOLUME ORBITAL TELEMETRY

[76] Inventors: L. Philip Sheldon, Jr., 8 West Roseville Rd., Lancaster, Pa. 17601; Robert Sheldon, 5 Thomas St., Woburn, Mass. 01801

[21] Appl. No.: 08/847,931

[22] Filed: Apr. 28, 1997

[51] Int. Cl.$^6$ .................................................. H04B 10/00
[52] U.S. Cl. .......................................... 359/172; 359/159
[58] Field of Search .................................. 359/172, 159, 359/152, 169, 170, 180, 181

[56] References Cited

U.S. PATENT DOCUMENTS

| | | | |
|---|---|---|---|
| 3,863,064 | 1/1975 | Doyle et al. ............................. | 359/172 |
| 5,390,040 | 2/1995 | Mayeux .................................... | 359/152 |
| 5,450,223 | 9/1995 | Wagner et al. .......................... | 359/124 |
| 5,486,833 | 1/1996 | Barrett ...................................... | 342/204 |

FOREIGN PATENT DOCUMENTS

| | | | |
|---|---|---|---|
| 0317374 A2 | 5/1989 | European Pat. Off. ............... | 359/172 |
| 004325426 A1 | 9/1994 | Germany ................................ | 359/172 |

*Primary Examiner*—Rafael Bacares
*Attorney, Agent, or Firm*—Coudert Brothers

[57] ABSTRACT

Detailed mapping of the magnetosphere is made possible by deploying hundreds of attitude-impervious microsatellites, in the form of small corner reflectors with piezoelectric mirror surfaces, from a single mother satellite at spacings of as little as 1 km in equatorial and elliptical orbits. The microsatellites carry magnetosensors whose output is transmitted to a ground station by modulating the reflection of a laser beam transmitted to the microsatellite by the ground station. Various refinements of the laser data link are also disclosed.

27 Claims, 2 Drawing Sheets

MICROSATELLITE SYSTEM FOR HIGH-VOLUME ORBITAL TELEMETRY

FIELD OF THE INVENTION

This invention relates to a system of gathering large volumes of data from space, and more particularly to a system using a large number of microsatellites communicating with ground stations by modulating a reflected laser beam.

BACKGROUND OF THE INVENTION

Magnetospheric sciences have, to date, relied on the study of isolated events, such as major magnetic storms. It is, however, highly desirable to synthesize the magnetosphere as a whole so that the relationship of such events to the entire geospace environment can be determined. Several large-scale computer models of the magnetosphere exist, but because of lack of sufficient observed data, they are based on assumptions which may or may not be correct.

Providing sufficient data to constrain the computer models in accordance with observed reality requires dense sampling of the magnetosphere on a global scale, as well as the transmission for analysis of huge quantities of digital data (on the order of 60 Gbytes per day). Such sampling presents a serious problem because the magnetosphere must be sampled at discrete locations by hundreds of satellites spaced, about 1 $R_E$ apart, but in critical regions, as little as 1-km from each other. The sampled data must then be transmitted to ground stations at a rate of 1 megabits per second. This is unfeasible both technically and economically with current satellite and telemetry technology.

SUMMARY OF THE INVENTION

The present invention provides a solution to the above-stated problem by using modulated laser reflection technology to reduce on-board telemetry equipment to the point where the sampling satellites can be made small enough and inexpensive enough so that more than hundreds of them can be launched into different orbits by a mother satellite that fits into the shroud of a commercial satellite-launching rocket.

In one aspect of the invention, the 10 Mbps modulation of the corner mirror which reflects the ground station's laser beam back to the ground station is achieved by a piezo mirror which is integrated in a multi-layer structure with the solar panels that power the micro satellite.

DESCRIPTION OF THE PREFERRED EMBODIMENT

I. The microsatellite

Figure 1:
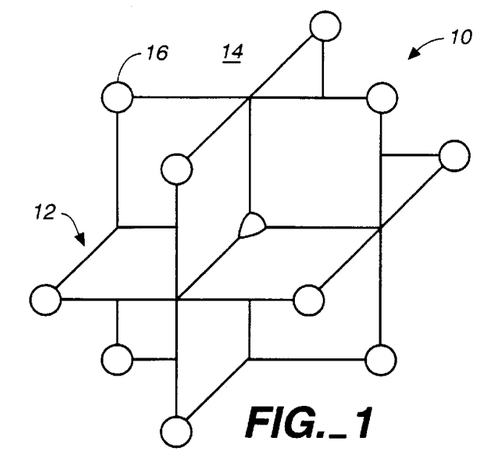
FIG. 1 is a perspective view of the microsatellite of this invention.

FIG. 1 illustrates one form of microsatellite 10 of this invention. The microsatellite 10 of FIG. 1 consists of eight corner reflectors 12, each formed by three orthogonal panels 14. Pods 16 at the corners of the panels 14 contain the sampling instruments, battery, memory and telemetry circuits. Because the corner reflectors 12 will accurately reflect a laser beam coming from any direction, the attitude of the microsatellite 10 is immaterial. This configuration therefore dispenses with the need for any attitude control, and thereby contributes greatly to the small size and low cost of the microsatellite 10. Other suitable configurations may be used and it may be preferable to increase the number of reflectors, for example using a "disco ball" type configuration.

The size of the microsatellite 10 may advantageously be about 10×10×10 cm when unfolded. The panels 14, as described in more detail below, may serve both as reflector and as solar panels which produce about 1 W of power. About 1 Gbyte of random-access memory is preferably provided on the microsatellite 10. An instrument package of one three-axis magnetometer, twelve pinhole diode sunsensors, and one scintillation detector/tether (for groups of microsatellites 10) can be provided in the pods 16 at a total weight of only about 300 g.

Figure 2A:
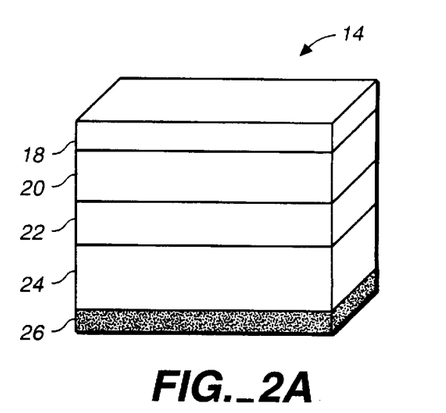
FIGS. 2a, 2b and 2c illustrate different preferred positions of the solar cells and piezoelectric mirrors on the reflector panels.

The panels 14 are advantageously constructed as a multilayer sandwich which performs both the function of a modulated reflector and the function of a solar panel. FIG. 2a shows the makeup of a typical panel 14. The outside layer 18 is preferably a thin, partially transparent mirror. Immediately under the mirror 18 is a layer 20 of a transparent piezoelectric material which deforms the mirror 18 when exposed to an electric current. Underlying the piezoelectric material 20 is a transparent conductor 22 for the piezoelectric signal. The solar panel 24 with its collector 26 underlies the conductor 22.

In an alternative embodiment of the invention (FIG. 2b), a transparent collector 26 forms the outside of the panel, with the partially transparent solar panel 24 lying beneath it. The mirror 18, piezoelectric layer 20 and conductor 22 are underneath the solar panel 24.

Figure 2B:
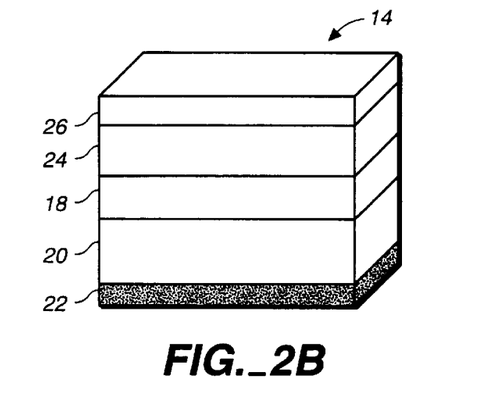
Figure 2C:
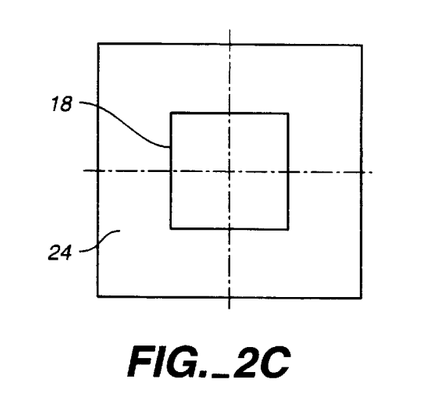

Both the embodiment of FIG. 2a and that of FIG. 2b have a disadvantage in that either the reflection intensity (FIG. 2b) or the solar panel efficiency (FIG. 2a) is somewhat reduced. The efficiency can be improved, albeit at the price of area reduction, by disposing the solar panel around the piezoelectric mirror (FIG. 2c).

Figure 3:
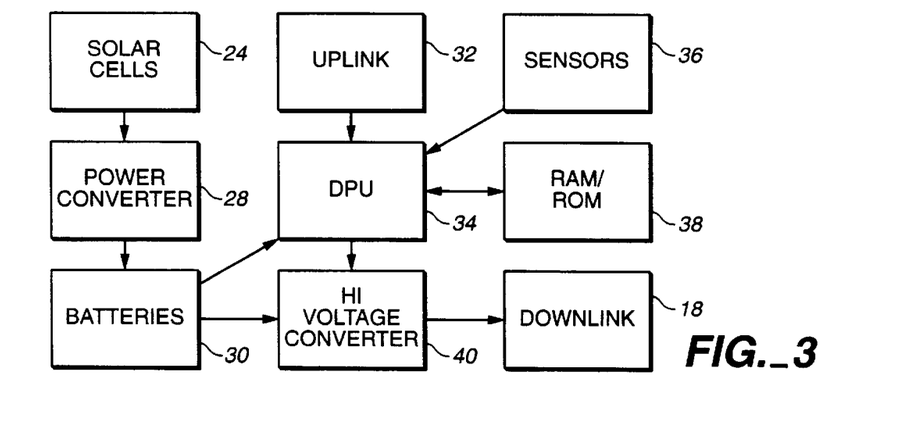
FIG. 3 is a functional schematic of the microsatellite.

The electrical makeup of the microsatellite 10 is illustrated in FIG. 3. The solar cells 24 are preferably gallium arsenide panels, but less expensive silicon solar panels with 15% efficiency could also be used. The power produced by the panels 24 is converted by the conventional power converter/charger 28 into a DC level appropriate for charging the battery pack 30 and operating the electronics of microsatellite 10. The converter 28 should be carefully designed to eliminate any radio-frequency noise, which could be picked up by the magnetometer sensor and could falsify the readings.

Commercial flatpack nickel-cadmium batteries can be used as the battery pack 30, provided they are screened for high quality. The life of the battery pack 30 can be greatly prolonged by using known sophisticated charging algorithms.

The uplink 32 consists of a sensitive photodiode which is illuminated by a laser beam from the ground station and is tuned to the frequency of that beam. A modulation of the uplink beam can be relayed to the digital processing unit (DPU) 34 and used to control the operation of the microsatellite electronics. Light-pipes or lenses may be used to increase the light-gathering power of the uplink photodiode 30.

The sensor 36 can be any devices or group of devices appropriate for the scientific use to which the microsatellite 10 may be put. Typically, these would be small, low-power, lightweight instruments such as a magnetometer, CCD particle detector, or perhaps a scintillation detector. Data produced by the sensor 36 is received by the DPU and stored in the RAM/ROM memory pending transmission to the base station.

The DPU 34 is preferably a commercial low-voltage, low-current chip such as the Power PC chips currently used in laptop computers. Likewise, the static RAM and programmable ROM for storing the operating programs and data can advantageously be commercial radiation-resistant 1 Gbyte units 38. With enough RAM, error correction code can be used to correct radiation-caused data errors.

When the uplink laser beam is modulated by the ground station to command a data readout, the DPU 34 retrieves the data from memory 38 and applies it in encoded form to the high voltage converter 40. The converter 40 is essentially a modulated high-frequency power supply which drives the piezoelectric material 20 of the mirror 18 in the megahertz range at a voltage on the order of 1 kV.

The downlink piezoelectric mirror 18 is the most critical part of the microsatellite 10. By providing the piezoelectric layer 20 of panel 14 with a very thin reflective mirror surface 18, the mirror surface can be made to undergo changes in its position in the megahertz frequency range, thereby producing a data-conveying modulation of the uplink beam reflected toward the ground station. The modulation may be of amplitude, phase or frequency of the laser beam.

The basic concept of the inventive modulated reflector is the use of a piezo material for the substrate of a front-surface mirror, so that a voltage applied across the piezo material causes the surface of the mirror to change its position to modulate the reflected beam. Several approaches are possible: varying the thickness of the piezo material so that differential contraction causes the mirrors to distort; using a polycrystalline thin film of piezo material that contracts randomly due to the random orientation of the crystal axes with the mirror normal; employing deformable mirrors with cantilevered actuators, or generating fast motion of the mirrors so as to Doppler shift the laser frequency. This last approach is FM modulation whereas the others are AM modulation.

The voltages needed for these distortions depend on the thickness as well as the properties of the piezo material. Modem piezo ceramics (e.g. $BaTiO_3$) have strains of about $1 \times 10^{-9}$ for applied electric fields of 1 V/m. The minimum contraction needed is about a wavelength. Thus, a 1 mm thick layer and a wavelength of 500 nm would call for a strain of $5 \times 10^{-4}$, which requires about 500 V across the ceramic. Solutions requiring less voltage would involve cantilever arms to deformable mirrors, but this would lower the frequency response of the mirror. Higher frequency, e.g. 710 MHz may give substantial velocity without much displacement.

The optical constraint on the corner reflector 12 is that each corner reflector must return enough modulated photons to the ground station to produce a readable 10 Mbps signal. This constraint determines the minimum size of the reflectors 12 and the tolerance allowed in their design. The physical constraint, on the other hand, is that the microsatellite 10 must be small enough so that hundreds of them will fit in launching condition in the shroud of a commercial rocket such as a Delta II. In practice, this means that the microsatellite 10 must have no dimension larger than 20 cm.

The optical efficiency of the laser beam reflection is greatly improved by using as short a laser light wavelength as possible. For example, the expected photons per bit per watt of laser power can be computed as follows for a $CO_2$ laser with a 10 mm wavelength and a green doubled-YAG or helium-argon laser with an 0.5 mm wavelength:

i. $CO_2$ Laser at 10000 nm

Using the rule-of-thumb that a 6" mirror gives diffraction limited images in the visible equal to the atmospheric distortion, the angular distortion of the originally parallel laser beam caused by atmospheric distortion is $\lambda d = 500$ nm/15 cm $= 3 \times 10^{-6}$ radians At geosynchronous orbit, 40,000 km from the earth, the spot size enlarges to $3 \times 10^{-6}$ radians $\times 40,000$ km $= 130$ meters since the intensity drops as the square of the spot size, we intercept about $(10 \text{ cm}/120 \text{ M})^2 = 7.5 \times 10^{-7}$ of the outbound signal.

The return intensity depends on the diffraction limitation of the mirror and the wavelength chosen. Using 10,000 nm for $CO_2$ laser with a ground station mirror of 2 meters gives the following estimate of signal decay on the return bounce:

10,000 nm/10 cm $= 1 \times 10^{-4}$ radians diffraction limiting $1 \times 10^{-4} \times 40,000$ km $= 4$ km spot size $(2 \text{ m}/4000 \text{ m})^2 = 2.5 \times 10^{-7}$ of the inbound signal The total decrease in signal strength is the product of the outbound and inbound legs, or $2.5 \times 10^{-7} \times 7 \times 10^{-7} = 1.9 \times 10^{-13}$ net reduction.

Then the photons in a single bit are

1 Watt $\times 1.6 \times 10^{19}$ eV/J $\times 8$ photons/eV $\times 1$ ms/bit $\times 1.9 \times 10^{-13} = 16$ photons/bit/Watt Of course, kilowatt $CO_2$ lasers are possible, raising the photons/bit figure to a more respectable number, but the long wavelength on the small mirrors 18 is a drawback that suggests a shorter wavelength laser might do better.

ii. Green Laser at 500 nm

If a doubled-YAG or He-Ar laser at 500 mn wavelength is used instead, the same numbers are true for the outbound leg, since the atmospheric distortion is relatively insensitive to wavelength. The inbound leg can then be calculated to 500 nm/10 cm $= 5 \times 10^{-6}$ radians diffraction limiting $5-10^{-6} \times 40,000$ km $= 200$ m spot size $(2 \text{ m}/200 \text{ m})^2 = 1 \times 10^{-4}$ Signal reduction on inbound leg The overall signal reduction is the product of the outbound and inbound leg, or $7.5 \times 10^{-7} \times 1 \times 10^{-4} = 7.5 \times 10^{-11}$ net reduction in signal Then the photons per bit are, 1 Watt $\times 1.6 \times 10^{19}$ eV/J $\times 0.4$ photons/eV $\times 1$ ms/bit $\times 7.5 \times 10^{-11} = 480$ photons/bit/Watt which is about a 30-fold improvement in the efficiency. Again, kilowatt lasers would be employed to compensate for atmospheric absorption and mirror losses, and to improve the signal-to-noise ratio.

a) The launch system

Figure 4A:
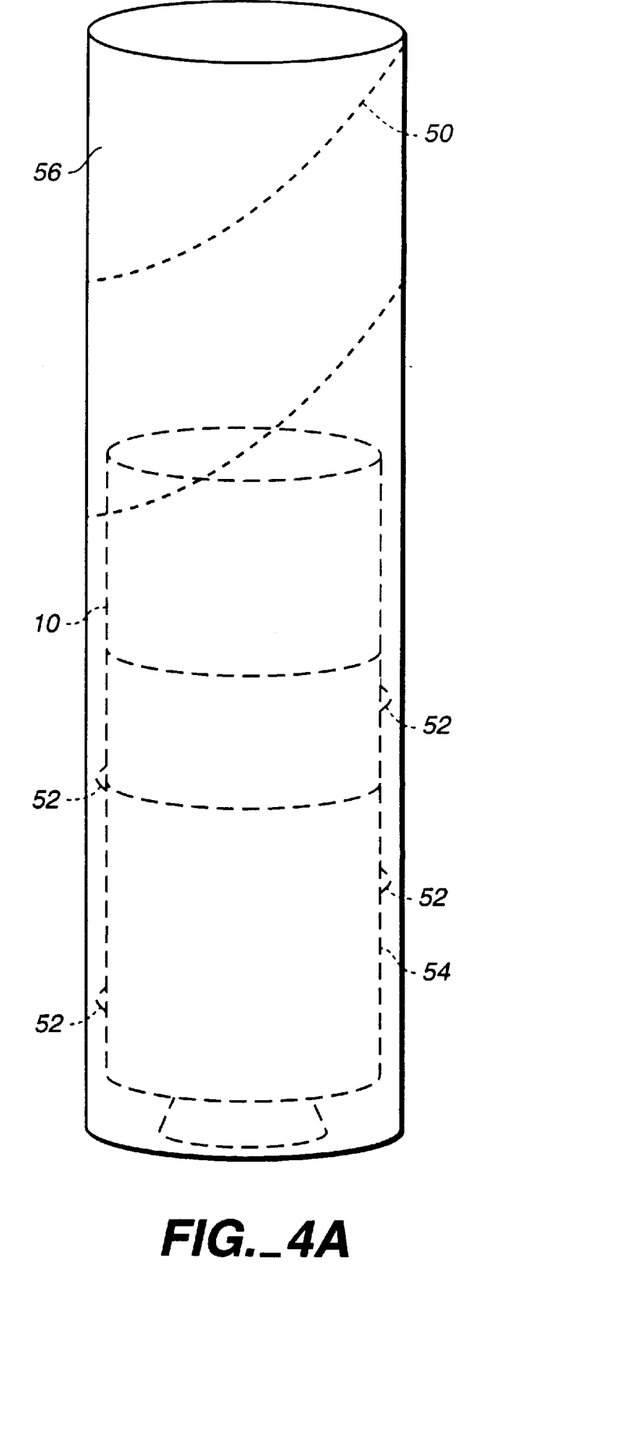
FIGS. 4a–c are, respectively, a detailed elevation, a perspective view, and a top plan view of the microsatellite launcher on the mother satellite.
Figure 4B:
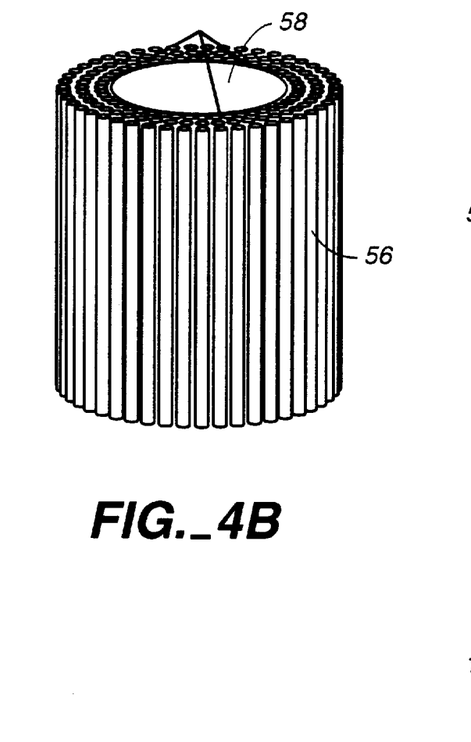
Figure 4C:
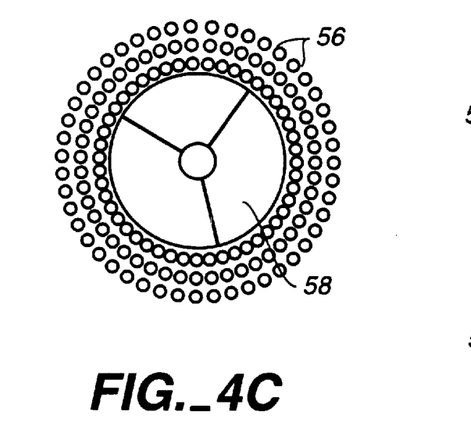

The number and small size of the microsatellites 10 require a special launching system. In accordance with the present invention, the microsatellites 10 are launched in orbit from a mother satellite which is in turn launched by an appropriate rocket such as a Delta II. Because the microsatellites 10 need no attitude control, they can use "dumb" solid-propellant boosters to achieve the approximately 3 km/s=ΔV needed for orbit insertion from a geosynchronous transfer orbit. If the microsatellite mass, $m_s$, is 1 kg, then the mass of the propellant, $m_p$, from the rocket equation is, $$m_p = m_s[\exp(\Delta V/I_p g) - 1]$$

where $I_p$ is the specific impulse for solid propellants (about 300 s) and g is the acceleration due to gravity. This results in a propellant mass of about 2 kg. With typical solid propellant densities of 1.8 g/cm$^3$, that mass fits into a cylinder 10 cm in diameter and 14 cm tall. Allowing for packaging and the nozzle, a launch system with the microsatellite will be about 30 cm long. The microsatellite 10 can be launched using spin stabilization, which is easily managed by adding rifling grooves 50 and teflon guides 52 (FIG. 4a) to the rocket motor 54. In the Delta II shroud, the launch tubes 56 can be extended nearly 5 meters, if necessary, to obtain the angular accuracy needed for the launch system (FIG. 4c).

The mother satellite 58 carries a collection of these launch tubes 56, so that the maximum number of microsatellites 10 is determined by the area of the rocket fairing. Allowing 2 cm for the launch tube 56 and 10 cm for the diameter of the microsatellite 10, about 114 cm$^2$ is required for the area of a single launcher. A Delta II has about 53100 cm$^2$ area, allowing up to 465 microsatellite launchers to be deployed. Since the mother satellite 58 must have precise attitude and orbit control, some of the volume has to be used for a kick motor and attitude control as well as a star-sensor (none of these conventional items are shown).

The mother satellite 58 is preferably put into a geosynchronous transfer orbit at 6.6 $R_E$ or higher, so that microsatellites can be placed into both high (10 $R_E$) and low (5 $R_E$) orbits needed to achieve a 1 $R_E$ spacing. The kick motor can be used to change the orbital inclination of the mother satellite 58 so as to cover the entire volume of the northern hemisphere. (Coverage of the southern hemisphere is not needed, as it may be assumed that the magnetosphere is symmetrical about the equator.)

Sampling the magnetosphere sufficiently densely to constrain the models is limited by the sheer volume of the enterprise. A simple calculation shows that the volume of a 5–10 $R_E$ shell is about 4×(10$^3$−5$^3$)=3500 $R_E^3$ which implies that the same number of satellites are needed for 1 $R_E$ spacing. Another constraint is the asymmetry of the magnetosphere, since a satellite at 15 $R_E$ will be in the magnetosphere perhaps 20% of the time and in the solar wind the remaining 80%. Therefore 10 $R_E$ is best used as the maximum radius because it is the nominal standoff distance of the magnetopause, meaning that circular orbits at this radius will remain inside the magnetosphere under nominal conditions. Because of the presumed N-S symmetry of the magnetosphere, it is sufficient to sample only the northern hemisphere. Two basic orbits are therefore used for the constellation: circular orbits in the equatorial plane, and elliptical orbits with apogee above the northern hemisphere.

Circular orbits have the advantage that the orbit does not evolve appreciably with time, which simplifies the constellation design. The crucial region to monitor for the magnetosphere is the equatorial plane, which is ideally suited for these orbits. However they have the disadvantage that they sample both hemispheres equally which, as indicated above, is redundant. Therefore, elliptical orbits are used for most of the scientific constellation.

The launch system described herein can place the microsatellites 10 into elliptical orbits around the earth from 5–10 $R_E$. Circular orbits are only possible with a single-burn motor if the mother satellite orbit intersects the circular orbit desired. With sufficient fuel, the mother satellite can be put into a 1×10 $R_E$ elliptical orbit and launch a single orbital plane (consisting of 6×[5+...+10]=270 microsatellites) into circular orbits with 1 $R_E$ spacing. Then a ΔV maneuver can rotate the orbital plane of the mother satellite and launch the elliptical orbits.

Although conceptually a 1 $R_E$ grid spacing is easy to visualize, the crucial requirement is the constraint on the models. Thus the placement of the remaining elliptical satellites will depend on knowing where the current theoretical models show the most variability, i.e. where a measurement provides the maximum constraint. For illustrative purposes, a "pincushion" of elliptical satellites with apogee at 10 $R_E$ spaced 1 $R_E$ apart requiring 6×(1+2+...+10)=330 satellites is deemed adequate. The total constellation would then be 600 microsatellites.

II. Communications Applications

Although the inventive system has been described above in connection with a telemetry system for a large number of microsatellites, it can also be used in communications applications. For example, one of the problems in satellite-to-satellite communications is that in two-way communication, each satellite conventionally acquires the other by scanning for reflections, but the two satellites then communicate with each other on separate lasers which may have different frequencies. The present invention simplifies this process by using laser beams for acquisition and for sending and receiving information. This makes acquisition faster and simpler, and the slave or repeater satellite can be small, light and inexpensive.

The basic component of the communication system is its "trunk line", which consists of multiple, laser beam interconnected satellites in a ring at the Earth's equator, between 1000–5000 miles altitude. The exact altitude depends on tradeoffs between who can attach to the trunk line (the higher the altitude, the higher the latitude on the ground) and the benefits of being at lower altitude (low time delay, fewer satellites needed, stronger signals received, etc.) At a given pair of locations on the globe where a telephone line connection is needed, a sufficient system may be deployed sufficient to serve those locations. A second launch can choose a more appropriate altitude for a second "trunk line". An example is Arizona and Australia as two endpoints. With Arizona greatest distance from the equator at about 30° north, and for viewing the satellites 10° above the horizon, the satellites need to be put into an orbit 1235 km above the surface (circular at 1.194 $R_E$). At this orbit, the satellites circle the earth in 110 minutes. If we assume sight lines right down to the horizon, 2 satellites can be kept in view at all times if spaced 15° apart for a total of 24 satellites.

There are two ways to provide laser line-of-sight communication between two satellites: either by pointing two lasers at each other, or by using one laser and one modulated retroreflector. The laser must be mounted on a 3-axis stabilized platform, which implies an expensive satellite, whereas the retroreflector need not have any attitude control at all, which implies an inexpensive satellite. What is new in the present invention is the concept of using a cheap retroreflector satellite to replace some (but not all) of the expensive laser satellites.

At an altitude of 1.194 $R_E$ 6 satellites would be required to get direct line-of-sight around the earth. If 3 of these satellites were repeaters, the cost could essentially be halved. Since 24 satellites provide continuous coverage at an Arizona station, an additional 18 repeaters would be needed, for a total of 3 laser satellites plus 21 repeaters. Thus the cost of a laser trunk line is reduced from 24 to 3 expensive laser satellites for an 80% cost savings.

Repeaters function by receiving a signal from the first satellite coming from one direction, and encoding this signal by modulating a mirror in a different direction, which can then reflect a second, "probe", laser beam from a second satellite, thereby allowing a "signal" beam to communicate with a "probe" beam, or, in effect, causing the laser beam to "turn a corner". The repeater satellite does not need attitude control, simply because the retroreflectors can return a probe beam from any position. However, if the satellite has attitude determination, it can calculate the angle between the signal and probe beams and modulate only the appropriate mirrors. This has the advantage of allowing the repeater to have simultaneous intersecting messages without cross-interference. Since attitude determination using simple sun and earth sensors is relatively cheap, the satellite remains inexpensive.

There can be several modes of operation of the repeaters. (a) If the signal and probe laser beams are the same, then the returned signal has two messages on it, the initial signal and the modulated probe. This means that the signal/probe beam must be decomposed into two data streams when it is returned to the laser satellite. (b) If a repeater is being used by two signal beams at once, and if all mirrors are working in unison, then the probe beam(s) will contain both intersecting messages. (c) If separate probe and signal beams are possible (e.g., by using two different frequency lasers) and if independent mirror controllers are used, then the probe beam need have only one message on it. (d) In a worst case, if two signals are arriving on combined probe/signal laser beams, and the mirrors are operating in unison, then the returned probe beam contains 3 messages that must be unraveled. Although options (a), (b), and (d) are clearly suboptimal, they do allow an overloaded system, or a damaged satellite "graceful degradation".

Clearly using (c), i.e. separate probe and signal laser beams with independent mirror modulation (from the attitude determination), will keep the system at maximum simplicity and throughput. The tradeoffs include adding additional sophistication to the mirror controllers with attitude determination in order to keep the probe beam at maximum throughput.

As calculated above, 24 satellites are needed to keep 2 above an Arizona station at all times. However only 6 are needed to pass a signal all the way around the earth. This means that one can view the system as one 6-satellite "ring", with additional repeaters providing an uplink/downlink to the earth, but not part of the ring. This ring operates at the throughput of the mirror modulation frequency (since the signal laser modulation frequency can be in principle much faster than the mirrors). It takes 3 laser satellites and 3 repeaters to create a ring in such an orbit so that in the example, the additional 18 repeaters can relay information back to a laser satellite, but they cannot be part of a ring unless they are visible by two laser satellites. However, the information can pass in both directions on a ring, since separate probe and signal lasers are used, and separate mirrors are modulated. Thus the bandwidth of the trunk line is equal to the modulation frequency of the mirrors, multiplied by the number of rings times 2. For the example using a 10 Mbps mirror modulation frequency, a 1-ring, 24-satellite constellation gives a throughput of 20 Mbps for the system. Additional throughput is possible by adding more laser satellites which allow more rings.

Since this is not a simple calculation, consider what happens when 4 laser satellites are employed with 20 repeaters. With this configuration one can have 3 rings, for a throughput of 60 Mbps. If 5 laser satellites and 20 repeaters are used, one has 4 rings with a throughput of 80 Mbps. If 6 laser satellites and 18 repeaters are used, then 3 rings operating at 20 Mbps, and one ring operating at much higher, optical fiber speed, say, 1 Gbps, may be used.

Clearly then, if money is not a major factor, a minimum of 6 laser satellites may be launched and repeaters may be used as purely uplink/downlink connections. However, should failures occur on the laser satellites, the system degrades "gracefully".

Again, if more than 6 laser satellites are launched, a single repeater can be viewed by more than 2 laser satellites, and can belong to multiple rings, especially if the modulated mirrors for the probe lasers are well separated. For a repeater satellite with 20 reflectors, the mirrors are separated by 30 degrees, so that probe lasers coming from greater than 30 degrees apart can be separated and therefore part of separate rings. For example, 7 laser satellites and 21 repeaters have 5 rings at 20 Mbps, and 1 ring at a Gbps.

Other combinations will be apparent to those of ordinary skill.

The ability of piezoelectric materials to be driven well into the megahertz range, and under favorable conditions as high as a gigahertz, makes the above-described piezoelectric mirror system competitive with separate lasers, which can presently function in the 0.8 to 1.2 Ghz range. Also, piezoelectric mirrors allow data bits to be encoded by frequency modulation, using the Doppler effect of the moving mirror. This provides a much clearer signal than the detection of amplitude changes due to the mirror deformation.

Considering the relatively low reflected photon count discussed above, it is sometimes necessary to filter out unwanted light noise from the sky or streetlights, but adequate filtration can be obtained through the use of atomic filters, optical heterodyning, or multiple lasers of different wavelengths which can be used to correct each other.

The latter technique can be used to make the returned signal immune to the effects of turbulent atmospheric conditions. Two laser wavelengths are transmitted simultaneously. If the satellite mirror modulation is wavelength dependent, then the ratio of the reflected beam changes when the mirrors are in a "1" or a "0" state. Thus this ratio would encode a bit, making the bit immune to random attenuations due to passing clouds or turbulence. It would thus be possible, with a reasonably powerful filter, to operate the system under daylight conditions, thus allowing 24 hour accessibility for the downlink.

The smallness of the microsatellites of this invention can be used to their advantage. It allows the use of the earth's magnetic field not only to torque (twist) the satellites into a different attitude, but also to "levitate" the satellites, giving them longevity despite air resistance slowing them down. Consequently, with no propellants or motors, the microsatellites of this invention can be made to adjust their orbit so as to "station keep," or even better, "de-orbit" the satellites at the end of their useful life and thereby resolve the "space junk" crisis that is afflicting the space station and all low earth orbit satellites.

Acquiring the microsatellites 10 can be speeded up, according to the invention, by a two-step method. The laser illuminates a 200 m spot at geosynchronous altitude. Thus the laser can either be raster scanned, or the laser can be defocused so as to cover the expected region of the sky. In either case, the important criteria for acquisition is the signal/noise ratio for the return. This can be greatly improved by putting the downlink into a standby mode, say, a 1 kHz modulation, so that a narrow bandpass filter at 1 kHz could be used. Then the algorithm for satellite acquisition will consist of an optimization of raster scanning and defocussing, depending on current seeing conditions. After the orbital elements are calculated, the acquisition will be much faster, requiring a much smaller region of space to be raster-scanned.

The laser and receiver, then, should be designed for fast raster scanning. This can be accomplished by small mirrors with high slew rates. Alternatively, solid state devices with refractive indices that depend on an electric field could be used to scan the laser. The receiver, as mentioned above, would consist of many small mirrors with inherently fast slew rates.

A satellite "ring" requires 6 lasers, a pair on each laser satellite looking forward and backward. Since adding lasers to a laser satellite is cheaper than adding laser satellites, additional rings can be constructed by adding a pair of lasers for each new ring, so that in the 4+20 scenario above, the three rings would require 6 lasers per laser satellite, each pointing at a different repeater. As mentioned above, separate lasers for signal and probe are advantageous, so the number above is preferably doubled to 12 lasers per satellite, though of course, only 6 pointing platforms are needed since the signal and probe lasers are co-aligned.

The laser satellite will need 3-axis stabilization and "fine-tuning" platforms for the 6 lasers. High slew rates or large slew angles are unnecessary because each laser will be pointing at satellites ahead and behind it in the same orbit so that relative motion will be very slow if not negligible.

Although many mechanisms have been used to generate 3-axis stabilized platforms, the basic needs of the present invention are less stringent than either military or geosynchronous platforms. Thus, a magnetically torqued satellite without gyroscopes or gravity-gradients may be suitable. Once the satellite is in a cartwheel spin, revolving once per 110 minute orbit, then only fine corrections of less than a degree need to be made for the lasers to track and acquire. This fine motion is accomplished with individual pointing mechanisms on each laser.

The laser satellites need a way of torqueing or twisting themselves into the correct alignment for laser communication. Also, both repeaters and laser satellites need a way to adjust their orbits to maintain station keeping. That is, if one satellite is one kilometer higher than the others, it will orbit more slowly and destroy the even spacing between the satellites. Rather than put fuel on these satellites for station keeping, the same torqueing coils can be used for levitation, allowing the satellites to station keep magnetically.

a) Torqueing

As is well known, current in a circular coil or solenoid will produce a dipole magnetic field that interacts with the earth's dipole field, generating a torque that attempts to make the two dipoles anti-align. A torque is distinguished from a force because it does not change the velocity of the satellite, only its attitude (or angular momentum). There are other forces, however, that can change the velocity of the satellite, but are generally much weaker than the torque. They operate much the same way that the gravity gradient technique uses gravity to develop a torque. These second order phenomena may be used to adjust the altitude (or velocity) of the satellite.

b) Levitation with the mirror force

Imagine a flexible loop of fine-gauge wire through which a few amperes of current are passed. In the presence of a magnetic field, the loop will expand to its maximum size because the wire experiences a force perpendicular to the B-field, called the Lorentz force or "j cross B" force. If the magnetic field is not unidirectional, then the forces integrated around the loop will not add up to zero, and there will be a net force on the loop that accelerates it. This force is sometimes called the mirror force. It is a bit like squeezing a watermelon seed, where the force of the thumb and finger do not completely cancel and the seed is accelerated. By making the loop flexible, it is allowed to become anti-aligned to the earth's dipole, and no further torque is generated on the spacecraft, but the mirror force will pull the loop away from the satellite, lowering its altitude. If the current in the loop is reversed (and the loop made rigid) then the satellite can be raised by this force as well.

c) Levitation with gradient force

A second force, which is a different manifestation of the same dipole—dipole interaction above, is the gradient force. At the equator, the dipole field of the earth is unidirectional, but not uniform across the loop. Thus one side of the loop is pulled outward harder than the other side, causing the entire loop to be again pulled in to the earth. A reversed current in a rigid loop will cause the loop to be levitated away from the earth.

d) Magnitudes in theory

To successfully accomplish the above, there must be sufficient magnitude for reasonable currents and loops. The relative magnitudes may be determined by using an energy conservation analysis, which incorporates all the forces listed above. In orbit, the force of gravity must balance the centripetal force, or for circular orbits:

$$mg\ (r/Re)^{\wedge}2 = m\ w^{\wedge}2 r \qquad [1]$$

where m is the mass, g is the force of gravity at the earth's surface, r is the distance from the center of the earth, Re is an earth radius, and w is the orbital angular velocity. In this formula, only r and w are variables, the remainder being constants. Thus, for a particular r, w is fixed by this equality.

Rephrasing this as an energy conservation equation and taking into account that the orbit may be somewhat elliptical, one can write:

$$mg\ (<r>/Re)^{\wedge}2 <r> + \tfrac{1}{2}m\ w^{\wedge}2 r\_a\ r\_b = \text{constant} \qquad [2]$$

where r_a is the radius of the minor axis and r_b is the radius of the major axis of the elliptical satellite orbit, and <r> is the average for any orbital shape. Thus, one may assume circular orbits for the remainder of this calculation, <r>=r_a=r_b=r.

The dipole—dipole interaction energy may be calculated as:

$$D = \{p1 * p2 - 3(n*p1)(n*p2)\}/r^{\wedge}3 \qquad [3]$$

where D is the dipole potential energy, p1 is one dipole vector, p2 is the second dipole vector, n is the vector direction between the two dipoles, and "*" is the vector "dot" product. Note that this energy is directly proportional to the magnitude of p1, the satellite dipole field strength, which can be written as the product of current times area, p1=I*A. If we define "d" to be the numerator so that D=d/r^3, we can write the energy equation as:

$$mg(r/Re)^{\wedge}2 + \tfrac{1}{2}m(wr)^{\wedge}2 + d/r^{\wedge}3 = \text{constant} \qquad [4]$$

This means that as one injects current into the torquer coils, an increase of d occurs. The difference between r_a and r_b is distorted from zero to a finite value, and the orbit is distorted from a circle to an ellipse.

By astutely turning the current on and off at the appropriate moments, the satellite can be pumped into a higher orbit, or given sufficient current the satellite can attain neutral buoyancy and achieve geosynchronous orbit at low earth altitudes. Part of the reason that this has not heretofore been used is that the dipole energy is independent of mass, whereas the other two energies depend on mass. Thus the ratio of the dipole strength to mass, IA/m, becomes the controlling ratio. When it is large, the orbits can be easily pumped. When it is small, it is negligibly pumped by the current. In very general terms, the current is proportional to the solar energy intercepted by the solar panels which is proportional to the cross-sectional area, whereas the mass is proportional to the volume. Thus if a satellite is roughly the shape of a sphere, then as the satellite is shrunk, the mass decreases by the cube, whereas the current decreases by the square, so that the ratio IA/m is very roughly proportional to 1/satellite size. Thus, a regime may be reached where magnetic levitation is quite competitive to other station keeping mechanisms.

In the operation of the system of the invention, the trunk line moves information around the system. The protocol for message passing can be one of the many accepted techniques such as token ring, TCP/IP, etc. The key point is that either the laser satellites or the repeaters have photodetectors on them that can respond to a signal laser beam of the appropriate frequency coming up from the earth. In the case of the repeater, this signal is encoded in the modulation of the appropriate mirror that is then read off by a laser satellite probe beam. (If the correct endpoint is also the startpoint as in a local telephone call, then the message need never leave the originating satellite.) The message or packet is then given the appropriate header and trailer information for the protocol and sent via the "ring" to the appropriate repeater or laser satellite.

At this point the "earth-pointing" or nadir mirrors are modulated, enabling a probe beam from the earth to download the message. If no probe beam is detected, then an error can be propagated back to the originating satellite, where presumably the sender has both a probe beam and a signal beam trained on the link. In this manner the verification of a proper signal handoff can be maintained.

Naturally, the uplink/downlink depends crucially on the quality of the link. As is typical of laser systems, clouds or smoke can easily degrade or completely block a link. Since these aspects of the link are not controllable, availability 100% of the time is not guaranteed. For many applications, however, this is not a serious liability.

The penetration problem can be mitigated by placing the ground stations in locales (e.g. desert mountaintops) where cloud cover is infrequent and, when present, is of relatively short duration. Alternatively, the laser can be positioned on a large satellite or a high-altitude platform such as a tethered balloon, which can communicate with a ground station by microwave or cellular telephone (i.e. radio-frequency) technology.

If a 100% link is desirable, one approach is to mitigate the atmospheric problem by flying a balloon at the tropopause, above the cloud layer. Then the signal may be propagated to the ground through either a tether or a radio/microwave link. Since balloons enhance service by making it as reliable as a microwave link, several possible balloon constructions may be used.

a) Standard high-altitude balloon construction, typified by the NASA balloon program, uses a single, nearly spherical bag with a gondola suspended beneath. Such a system may be used for the system of the invention, putting a laser in the gondola, providing that the bag did not block the view of the satellite. That is, excluding a latitude band directly under the satellite track, the balloons should be able to point the laser at an angle from the vertical and see the satellites. For balloons near the equator, this geometry can still be favorable if there are enough satellites in the orbit that satellites ahead and behind can be seen at large angles to the vertical. Since this is generally the case, the single bag, single gondola balloon can be used.

(b) Long duration flights are highly desirable, and to its credit, NASA has succeeded in having several week duration flights near the poles (where the balloons are caught in the polar vortex and travel in a circle). Several month durations would probably be required to make the balloons economically feasible. Since loss of buoyancy is the major problem in long duration flights, there are several options for replenishing lost gas:

(i) Flying extra gas, either compressed or chemically dense forms (liquid hydrogen, liquid ammonia, etc.)

(ii) Generating additional gas, for example by electro-chemical dissociation of water into hydrogen.

(iii) Capturing extra gas, for example by collecting the water for (ii) from clouds, or by fractionating hydrogen and helium from the atmosphere using highly selective membranes, or by air liquification followed by fractionation.

(iv) If micro-meteoroids are responsible for leaks, a self-healing balloon membrane may be necessary to obtain long duration flights.

(c) Since short duration flights are the norm, batteries are often used in scientific ballooning. This would not be sufficient for a long duration flight, so that solar cells would need to be used. Since the balloon is already a huge solar collector, a relatively inefficient photo-electric plastic film may prove superior to conventional silicon cells as a photo-electric energy source.

(d) By far the biggest problem is station keeping. The stratospheric winds are several hundred miles per hour, so that the balloons will drift off station rapidly unless tethered or powered. A third option is to space the balloons out so that they too form a dense orbit. If the winds are purely zonal, blowing along a constant latitude, at an altitude of 20 miles giving a footprint on the earth 400 miles wide, then 25,000/400=63 balloons are needed to keep continuous contact with equatorial stations. Thus free drifting balloons are not an efficient way to solve this problem, except perhaps at the poles or near other persistent vortices.

(i) Powered.

Since at low velocities, propellers are more efficient than jets, a streamlined gas bag, much like the pre-war blimps can be employed with a large propeller out front powered by solar cells.

(ii) Tethered

Tethers, where permitted by air-traffic controllers, are very attractive. Not only is the weight within the capability of the balloons to lift, but the tethers can be made so as to bring power and gas up from the ground and carry fiber-optic signals both directions. In locations with low-lying fog or clouds, a 1-mile tethered balloon may be ideal for solving the laser link problem.

Although a 1000 km orbit remains below most of the radiation belts, the use of commercial computer chips using CMOS technology makes them extremely sensitive to radiation damage. Passive shielding is possible but both heavy and bulky, which may not prove cost effective for the applications detailed herein. A second approach makes use of temperature annealing of radiation damage, and redundant or parallel computation to handle single event upsets (SEU). The idea is that many SEU's do not cause catastrophic "latch-up" but do corrupt the data. This can be compensated in software, where bit flips are caught by error correction code. Catastrophic "latch-ups" or deep dielectric discharges can cause not only data corruption, but hardware damage, and must be prevented from the outset. Passive shielding, with dense metals such as tantalum or tungsten, reduces the overall integrated effect, but can neither stop the large flares, nor cure the accumulated damage. However by temperature cycling the chips, much of the accumulated damage can be annealed and removed. That is, if two or more chips are arranged in parallel, so that one or more of them can be turned off and heated independently, it may be possible to have uninterrupted use of a working computer chip. Since thermal cycling can also degrade the chips, an algorithm would need to be optimized for fast cycling only during times of intense radiation. In this manner, inexpensive, commercial off-the-shelf computer chips could be used rather than "radiation hardened" chips that are inherently 24 months out-of-date at delivery, as well as much more expensive.

Since the network of this invention is bandwidth limited, it would be extremely helpful to compress the signal before transmitting. Many long distance carriers do this, though they generally do not use the maximum compression because of perceived "quality degradation". For many third-world users, such low quality service is still infinitely better than no service at all. If such compression were built into the telephones, then local as well as long distance calling could be done cheaply. In addition, if "word" or "phoneme" recognition were made, then the data stream would be additionally compressed. Should this technology be available, the step to automatic translation is relatively painless. Thus not only image compression, but universal communication is made possible for many who would otherwise not have it.

The basic idea here is to put as much horsepower into the telephone itself, and reduce the requirements on the network and interconnects. The X-windows interface is an analogous system dealing with computer GUI interaction, and this invention would be taking that analogy into the realm of voice communications.

With voice recognition the keypad is rendered unnecessary, allowing the entire telephone to shrink to the size of a credit card or a hearing aid. Thus telephones could be as ubiquitous and commonplace as a wristwatch, and with the same universal appeal.

Finally, paper billing is out of the question when telephone companies span countries and currencies. If the telephone is a nearly disposable commodity, then the "hours of usage" can be inserted on the telephone chip much the same way that "smart" credit cards work in Europe. It is envisioned that a secondary market will spring up in telephones effectively reaching many of that 3 billion "unconnected" population who are not so easy to find through conventional markets.

It will be understood that the foregoing discussion of the invention is by way of example only, and many other applications of the inventive technology are possible. Consequently, the invention is not to be deemed limited by the above description, but only by the scope of the appended claims.

What is claimed is:

1. A communication system for space-borne data devices, comprising:
   a. a platform containing a laser beam source;
   b. a data device spaced from said platform and containing a corner reflector receiving and reflecting a laser beam emanating from said source, and a source of data to be transmitted; and
   c. a modulator on said data device arranged to transmit said data by varying the surface position of said corner reflector when reflecting said laser beam to modulate the amplitude, phase or frequency of said laser beam.

2. The system of claim 1, in which said modulator includes:
   (1) a body of piezoelectric material;
   (2) a body of mirror material in motion-transmitting relation to said piezoelectric material;
   (3) a piezoelectric driver operatively so connected to said source of data to be transmitted and to said piezoelectric body as to cause said piezoelectric body to vary the surface position of said mirror body in accordance with data being transmitted.

3. The system of claim 2, in which said corner reflector consists of layered panels orthogonally disposed to each other, and said piezoelectric body and mirror body are adjacent layers of said panels.

4. The system of claim 3, in which said panels also include layers forming solar cells.

5. The system of claim 4, in which said mirror layer forms the surface of said panels.

6. The system of claim 4, in which said solar cells form the surface of said panels.

7. The system of claim 4, in which said mirror layer forms the surface of a portion of said panels, and said solar cells form the surface of other portions of said panels.

8. The system of claim 1, in which said laser beam source is a green laser having a wavelength of substantially 500 mn.

9. A satellite system for providing high levels of data telemetry, comprising:
   a. a large plurality of orbiting microsatellites, each microsatellite being in the form of an array of corner reflectors so arranged as to reflect laser beams impinging on said microsatellite from any spatial direction;
   b. an earth-based station arranged to sequentially illuminate said microsatellites with a laser beam; and so receive the reflected laser beam therefrom;
   c. instrumentation on said microsatellites arranged to produce data to be transmitted to said earth-based station; and
   d. a variable reflectance mirror on said corner reflector so operatively connected to said instrumentation as to modulate said reflected laser beam in accordance with the transmission of said data.

10. The system of claim 9, in which said variable reflectance mirror is a piezoelectrically deformable mirror.

11. The system of claim 10, in which said modulation is detected by said earth-based station in the form of amplitude variations in said reflected laser beam.

12. The system of claim 10, in which said modulation is detected by said earth-based station in the form of a cyclical Doppler shift of said reflected laser beam in accordance with a cyclical vibration of said piezoelectrically deformable mirror.

13. The system of claim 10, in which said piezoelectric mirror is vibrated in the megahertz range.

14. A launch system for microsatellites, comprising:

a) a mother satellite capable of controlling its orbital attitude;

b) a rocket arranged to launch said mother satellite, said rocket having a shroud receiving said mother satellite for launch; and c) a large plurality of launch tubes mounted on said mother satellite, each of said launch tubes containing a microsatellite devoid of attitude control apparatus, each of said launch tubes also containing a single-burn propellant charge for launching said micro satellite.

15. The launch system of claim 14, in which said microsatellites are corner reflectors.

16. The launch system of claim 14, in which said launch tubes extend in the longest direction of said shroud when said mother satellite is in said shroud.

17. A method of positioning a large plurality of microsatellites for sampling the magnetosphere at intervals of as little as 1 km, comprising the steps of:

a) launching a mother satellite carrying a large plurality of corner reflector microsatellites into an orbit intersecting the equatorial plane;

b) launching a portion of said microsatellites from said mother satellite into an orbit in said equatorial plane; and c) launching the remainder of said microsatellites from said mother satellite into elliptical orbits.

18. The method of claim 17, in which all of said elliptical orbits lie in the same hemisphere with respect to said equatorial plane.

19. A communication system for weather-impervious laser communication between a ground station and an extra-atmospheric device receiving and sending data on a laser carrier comprising:

a) a ground station having radio-frequency transmitting and receiving apparatus; and b) a platform positioned at an altitude clear of any expected cloud cover, said platform having both radio-frequency and laser transmitting and receiving equipment, and equipment translating a data stream between radio-frequency and laser carriers;

c) said ground station transmitting data on a radio frequency carrier to said platform for translation and retransmission by said platform to said extra-atmospheric device on a laser carrier, and said platform receiving data on a laser carrier from said extra-atmospheric device for translation and retransmission, by said platform to said ground station on a radio-frequency carrier.

20. The system of claim 19, in which said platform is a high-altitude balloon.

21. The system of claim 19, in which said extra-atmospheric device is a high-altitude balloon.

22. The system of claim 19, in which said extra-atmospheric device is a satellite.

23. A method for providing between a ground station and a satellite a laser communication path impervious to atmospheric disturbance, comprising the steps of:

a) simultaneously illuminating said satellite from said ground station with a plurality of laser beams of different frequencies;

b) reflecting said laser beams as data carriers from said satellite back to said ground station;

c) comparing said reflected laser beams; and d) using differences in the data carried by said reflected laser beams to compensate for atmospheric distortion of said laser beams.

24. The method of claim 23, in which said laser beams transmitted from said ground station are identically data-modulated by said satellite, and are reflected to said ground station as so modulated.

25. A method of initiating laser communication between two orbiting satellites with a single acquisition, comprising the steps of:

a) acquiring a slave satellite carrying a corner reflector from a master satellite by scanning a volume with a laser beam to detect a reflection thereof;

b) locking said master satellite onto said reflection; and c) transmitting data over said laser beam;

d) detecting said data on said slave satellite; and e) causing said slave satellite to modulate said reflection to communicate data to said master satellite.

26. The method of claim 25, further comprising the steps of:

f) modulating said reflection at a low frequency during acquisition, and modulating it at a high frequency during communication.

27. The method of claim 26, in which said low frequency is in the kilohertz range, and said high frequency is in the megahertz range.

* * * * *